April 19, 1949.　　　E. T. JOHNSON　　　2,467,530
COUPLING DEVICE
Filed April 10, 1947　　　2 Sheets-Sheet 2
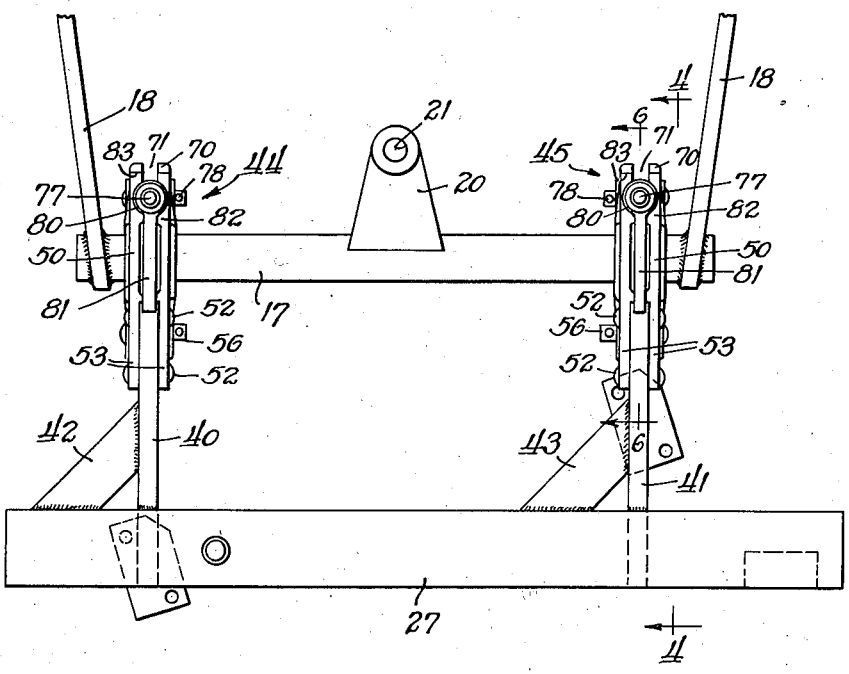
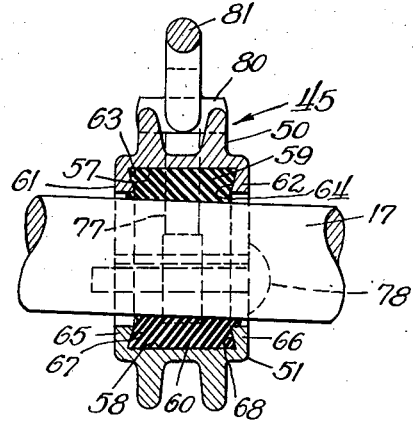
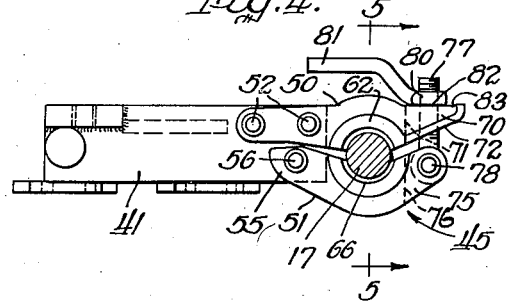
Inventor:
Ellsworth T. Johnson Patented Apr. 19, 1949

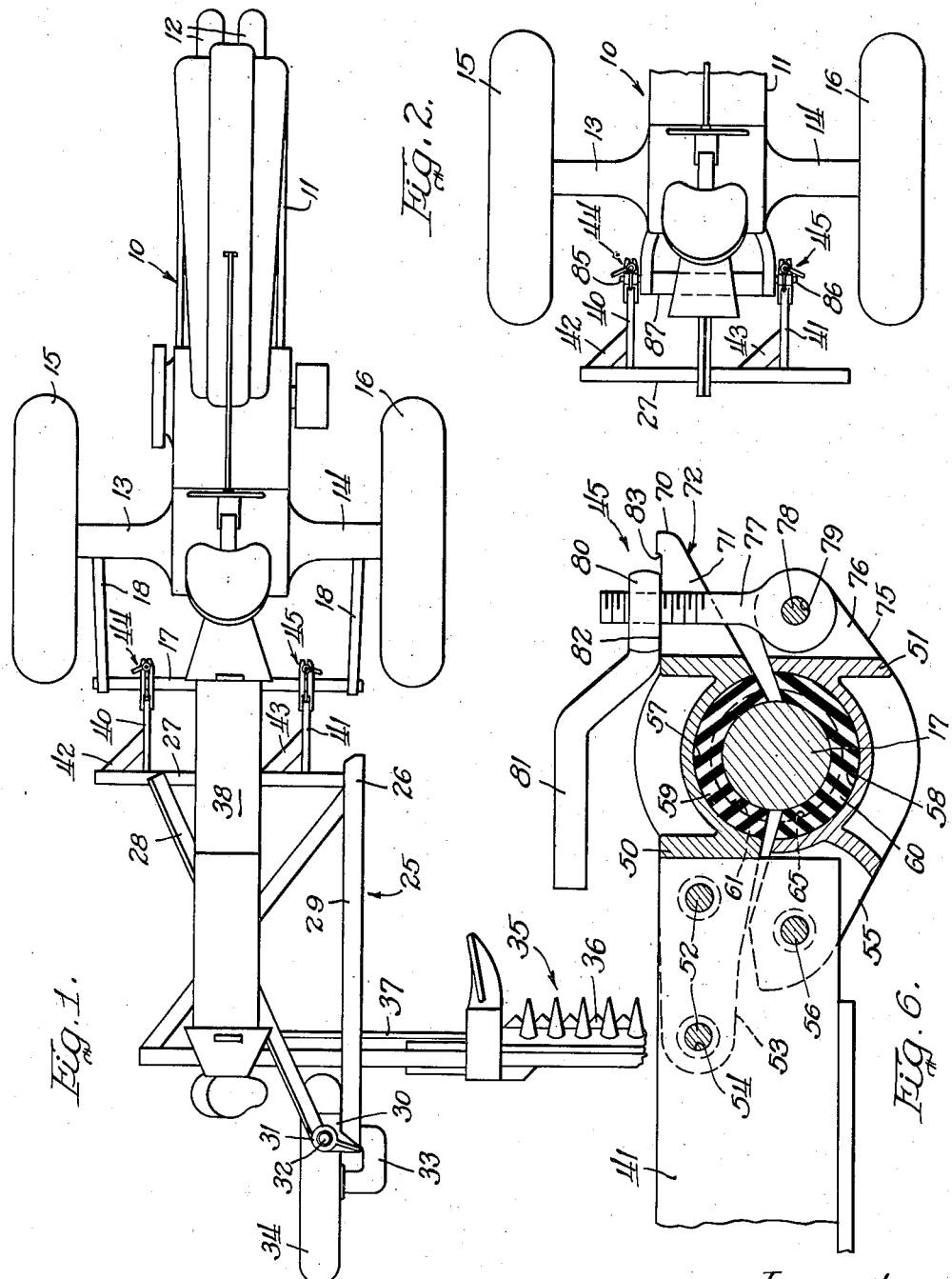

2,467,530

UNITED STATES PATENT OFFICE 2,467,530

COUPLING DEVICE

Ellsworth T. Johnson, Moline, Ill., assignor to Deere & Company, Moline, Ill., a corporation of Illinois Application April 10, 1947, Serial No. 740,552

4 Claims. (Cl. 280—33.9)

1

The present invention relates generally to coupling devices for coupling a pair of mobile units together, such as, for example, a tractor and an implement, and has for its principal object the provision of a novel and improved coupling device which is quickly attachable and detachable and which is simple in construction but strong and durable in service.

Another object relates to the provision of a coupling device for coupling a tractor to an implement of the type comprising a rigid frame which is supported at one end on a castering support and is adapted to be supported at the opposite end upon a drawbar or other part of a tractor and which provides for relative angular movement between the frame and the tractor about a transversely disposed axis as the tractor and implement move over uneven ground.

Still another object relates to the provision of coupling means for coupling a semi-mounted implement to a tractor, providing for relative vertical angular movement therebetween but preventing any appreciable relative lateral swinging movement.

A still further object relates to a coupling device which provides for said relative vertical swinging movement without any frictional wear between the surfaces of the coupled elements. A related object relates to a device which has cushioning means for damping vibration of the implement.

Still another object relates to the provision of coupling means which provides for interengagement of the coupling elements simply by moving the tractor into coupled position. The coupling elements are provided with inclined surfaces for raising the implement and dropping it into supported relation on the tractor drawbar.

These and other objects and advantages of the present invention will be apparent after a consideration of the following description, in which reference is had to the drawings appended hereto, in which Figure 1 is a more or less diagrammatic top plan view of a tractor and semi-mounted mower coupled thereto by coupling devices embodying the principles of this invention;

Figure 2 is a fragmentary top plan view showing a portion of the tractor and a portion of an implement frame with a modified coupling arrangement;

Figure 3 is a fragmentary top plan view drawn to an enlarged scale showing the coupling arrangement illustrated in Figure 1;

Figure 4 is a sectional elevational view taken along a line 4—4 in Figure 3;

2

Figure 5 is a sectional elevational view taken along a line 5—5 in Figure 4 and drawn to an enlarged scale; and Figure 6 is a sectional elevational view taken along a line 6—6 in Figure 3 and drawn to the same scale as Figure 5.

Referring now to the drawings, the tractor is indicated in its entirety by reference numeral 10 and is a conventional tractor of the tricycle type comprising a narrow longitudinally extending body 11 supported on a pair of closely spaced dirigible front wheels 12 and having a pair of laterally extending rear axle housings 13, 14 carried on traction wheels 15, 16, respectively. The tractor is provided with a drawbar structure comprising a transversely disposed drawbar 17 fixed at opposite ends thereof, respectively, to a pair of supporting arms 18, which extend rearwardly from the tractor axle housings 13, 14, respectively, on which they are mounted by any suitable means (not shown). The transverse drawbar 17 is provided with a forwardly extending arm 20 substantially midway between the ends of the drawbar and provided with a vertical aperture 21 for the purpose of pivotally connecting the draft tongue of any implement or wagon.

Connected to the drawbar 17 by coupling means to be described is a mower 25 comprising a rigid frame 26 including a front transverse frame member 27 and a pair of rearwardly converging frame members 28, 29, joined together at their rear ends by a plate 30 which also supports a vertical bearing sleeve 31 in which the spindle 32 of a caster wheel axle 33 is journaled, the axle being carried on a caster wheel 34. A cutter bar 35 is disposed alongside the frame 26 and is mounted thereon in the usual manner, and has a reciprocating sickle 36 driven by a pitman 37 which receives power from the tractor engine transmitted through a power shaft (not shown) disposed beneath a protective shielding 38.

The details of the mower 25 have not been elaborated herein, for this is an old and well known type of mower and further information thereon can be obtained from Patent 1,946,541, granted February 14, 1934, to Coultas et al.

Coming now to that part of the structure with which my invention is more directly concerned, the forward end of the mower is supported on a pair of arms 40, 41, which are rigidly fixed, as by welding, to the front transverse frame member 27 in laterally spaced relation to each other and are braced by diagonal bracing members 42, 43, welded between the arms 40, 41 and the transverse frame member 27. Each of the arms 40, 41 is attached at its forward end to the transverse drawbar 17 by means of a quickly attachable and detachable coupling device, indicated generally by reference numerals 44, 45, respectively. Inasmuch as the coupling devices are substantially identical, a description of one will suffice for both.

The coupling device 45 comprises a pair of upper and lower cooperating jaws 50, 51, the upper jaw 50 being rigidly fixed, as by rivets 52, to the forward end of the arm 41. The upper jaw 50 is bifurcated to provide a pair of supporting elements 53 disposed on opposite sides of the arm 41 and the rivets 52 extend through suitable apertures 54 in the elements 53 and the arm 41.

The lower jaw 51 has a rear end portion 55 which is also bifurcated to receive the forward end of the arm 41 therebetween and is hinged to the latter by means of a pivot pin 56, the axis of which is disposed transversely of the arm 41, providing for vertical swinging movement of the lower jaw 51 on the pin 56.

The jaws 50, 51 have a pair of complementary, substantially hemi-cylindrical recesses 57, 58 adapted to receive the drawbar 17 therebetween. Seated within the recesses 57, 58 are a pair of rubber bushing sections 59, 60, respectively, also substantially hemicylindrical in form. The outer surfaces of the bushing sections 59, 60 are formed as cylindrical segments which fit snugly within the segmental recesses 57, 58 and the inner surfaces of the rubber bushing sections are also formed as segments of a cylinder and fit on the cylindrical drawbar 17 in opposed relation. The upper jaw 50 is provided with a pair of radially inwardly extending flanges 61, 62 adapted to confine the upper bushing section 59 and having inwardly converging surfaces 63, 64 adapted to retain the bushing section in the recess 57. Similarly, the lower jaw 51 is provided with laterally spaced flanges 65, 66 having inwardly facing surfaces 67, 68 for confining and retaining the lower bushing section 60 in the recess 58.

The upper jaw 50 is also provided with a forwardly extending nose portion 70, which is bifurcated to provide a vertical fore and aft extending slot 71 extending from the tip of the nose 70 to a location adjacent the recess 57. The bottom surface 72 of the nose 70 is inclined downwardly and rearwardly for purposes which will appear later.

The lower jaw 51 has a forwardly extending bifurcated nose 75 providing a vertical longitudinally extending slot 76 to receive therein a clamping element in the form of an eyebolt 77 swingably connected to the nose 75 by means of a pivot pin 78, which extends through the eye 79 of the bolt 77 and through a pair of suitable aligned apertures in the bifurcated nose 75. The pivot pin 78 is disposed on a transverse axis, thereby providing for vertical swinging movement of the eyebolt 77 into and out of the slot 71 in the upper nose 70. The upper end of the bolt 77 is threaded to receive a cooperative nut 80, which is provided with a handle 81 by which the nut 80 can be tightened on the bolt 77 down on the top surface 82 of the bifurcated nose 70. A shoulder 83 is provided on the top surface 82 near the outer end of the nose and serves to engage the nut 80 to prevent the bolt 77 from swinging forwardly out of the slot 71 unless the nut 80 is loosened appreciably on the bolt 77.

The operation of the coupling means is as follows:

With the mower frame 26 jacked up to hold the upper jaws 50 substantially on the level of the tractor drawbar 17, and the lower jaws 51 hanging downwardly from the hinge pins 56, the tractor 10 is backed until the drawbar 17 engages the inclined lower surfaces 72 of the upper jaws, thereby raising the latter and mower frame until the tractor drawbar 17 is moved into the recesses in the upper rubber bushings 59 and the forward end of the mower frame 26 is supported on the drawbar 17. The lower jaws of the two coupling devices 44, 45 are then swung upwardly to grip the drawbar 17 between the upper and lower rubber bushing segments 59, 60 and the eyebolts 77 are swung upwardly into the slots 71 in the upper noses 70. The nuts 80 are then tightened by means of the handles 81 down on top of the bifurcated noses of the upper jaws 50. In case the ground is not exactly level, the bushing segments 59, 60 can flex slightly, as indicated in Figure 5, but generally the forward member 27 of the mower frame is maintained substantially parallel to the drawbar 17 and is prevented from appreciable lateral tilting and also horizontal angular movement relative thereto. As the tractor and implement move along the ground, the forward end of the mower frame is carried on the drawbar 17, while the rear end is carried on the caster wheel 34. When the ground surface is uneven, there is a tendency for the implement frame 26 to swing vertically about the axis of the drawbar 17 and this is accommodated by the flexibility in the rubber bushing sections 59, 60 without any sliding movement between the surfaces of the rubber bushing sections and the drawbar 17 or the sockets 57, 58.

The rubber bushing sections 59, 60 also damp any vibrations set up in the mower frame 26 by the reciprocation of the sickle 36 or otherwise and prevent such vibrations from being transmitted in full amplitude to the drawbar 17.

The coupling devices are readily disengaged by unscrewing the nut 80 by means of the handle 81 until the bolt 77 can be swung forwardly and downwardly from the slot 71.

In the modified form of Figure 2, the coupling devices 44, 45 engage a pair of short trunnions 85, 86, respectively, fixed to opposite sides, respectively, of a draft frame 87 mounted rigidly beneath the tractor body and extending rearwardly therefrom. In this embodiment the trunnions 85, 86 take the place of the single transverse cylindrical drawbar 17, but otherwise the two embodiments are similar.

I claim:

1. Means for coupling a tractor to one end of an implement of the type comprising a rigid frame having a castering support at the other end comprising transversely disposed cylindrical bar means mounted on the tractor, a pair of laterally spaced coupling devices, each of said devices comprising a pair of cooperative separable jaws having opposed complementary recesses adapted to receive therebetween said bar means, rubber bushing means adapted to seat in said opposed recesses and having recessed inner surfaces adapted to grip said bar means, disengageable means for clamping said jaws together upon said bushing means, and means for rigidly mounting one of each pair of jaws on said implement frame, said bushing means having sufficient flexibility to provide for a limited amount of angular movement of said frame relative to said bar about the major axis of the latter as the implement travels over uneven ground but preventing appreciable relative lateral swinging movement of the implement and tractor.

2. Means for coupling a pair of mobile units comprising a horizontal bar mounted on one of said units, a pair of upper and lower cooperating jaws mounted on the other unit, the upper jaw being rigidly fixed thereto and the lower jaw being swingable vertically relative thereto, said jaws having opposed complementary recesses adapted to receive said bar therebetween, a pair of rubber bushing sections seated in said opposed recesses and having recessed inner surfaces adapted to grip said bar, said upper jaw having an outer end portion the lower surface of which is inclined outwardly and adapted to bear upon the top of said bar to raise the upper jaw and associated unit as the units are moved together into coupled relation to drop said upper recessed jaw over said bar, and disengageable means for clamping said jaws together upon said bushing sections and bar.

3. The combination set forth in claim 2, including the further provision that said outer end portion of the upper jaw is provided with a longitudinally extending vertical slot and said clamping means comprises an element pivotally mounted on the outer end of said lower jaw and swingable upwardly into said slot.

4. Means for coupling a pair of mobile units, comprising a horizontal bar mounted on one of the units, upper and lower cooperating jaws mounted on the other unit, one jaw being rigidly fixed to said other unit and the other jaw being swingable vertically relative thereto, said jaws having opposed complementary recesses adapted to receive said bar therebetween, a pair of rubber bushing sections seated in said opposed recesses and having recessed inner surfaces adapted to grip said bar, said fixed jaw having an outer end portion provided with an inclined surface adapted to bear against one side of said bar to raise one unit with respect to the other when the units are brought together into coupled relation to cause the rigid jaw to receive the bar, and disengageable means for clamping said jaws together upon said bushing sections and bar.

ELLSWORTH T. JOHNSON.

REFERENCES CITED

The following references are of record in the file of this patent:

UNITED STATES PATENTS

| Number | Name | Date |
|---|---|---|
| 747,039 | Bradley | Dec. 15, 1903 |
| 747,043 | Bradley | Dec. 15, 1903 |
| 1,993,260 | Burns | Nov. 5, 1935 |
| 2,136,440 | Hufferd | Nov. 15, 1938 |
| 2,168,148 | Arehart | Aug. 1, 1939 |
| 2,189,864 | McDaniel | Feb. 13, 1940 |
| 2,361,362 | Altgelt | Oct. 31, 1944 |
| 2,362,712 | Morkoski | Nov. 14, 1944 |